United States Patent Office 3,183,056
Patented May 11, 1965

---

3,183,056
PROCESS FOR GRAFT COPOLYMERIZING BATH LIQUID AND VAPOR MONOMERS ONTO CELLULOSE SUBSTRATES
Robert H. Pfeiffer, Wattwil, St. Gall, Switzerland, assignor to W. R. Grace & Co., Cambridge, Mass., a corporation of Connecticut
No Drawing. Filed Nov. 28, 1961, Ser. No. 155,492
7 Claims. (Cl. 8—116.2)

This invention relates to an improved process for grafting monomers to cellulosic materials, and particularly to a grafting process in which the substrate is a fibrous web such as paper.

The beneficial effects of grafting monomers to cellulosic substrates are well known. Many characteristics, particularly resistance to attack by acid, may be greatly improved by applying a polymeric material to the substrate by means of graft polymerization. Papers which have been rendered acid-resistant by this means may be used as separators for electric storage batteries or in any other application where a high degree of resistance to attack by acid is essential.

Grafting has been carried out in the past by immersing an initiator-treated cellulosic substrate in a liquid monomer. This procedure, however, generally results in the formation of very large quantities of homopolymer, the entire reservoir of liquid monomer often becoming a single solid mass of polymer. If enough polymerization inhibitor is added to the liquid monomer to prevent this from happening, the graft polymerization reaction may also be seriously inhibited. More recently, it has been proposed to graft polymerize certain monomers on cellulosic substrates by introducing a cellulosic substrate which has been soaked in an aqueous solution of initiator into an atmosphere of monomer in the vapor phase. Various easily vaporizable unsaturated, addition-polymerizable monomers have been used in vapor phase graft polymerization, including, for example, methyl methacrylate, ethyl acrylate, chloroprene, acrylonitrile, and vinyl acetate.

It is often desirable to graft combinations of monomers to the cellulosic substrate in order to obtain special properties such as greater flexibility or increased acid-resistance, and also in order to take advantage of the higher reaction rates which are frequently observed in copolymerization reactions. Combinations of easily vaporized monomers such as those shown above, for example mixtures of acrylonitrile with ethyl acrylate or chloroprene, have been used to graft copolymers to cellulosic substrates by the vapor phase grafting process above referred to. Many substances, however, which would be valuable as co-monomers in the graft polymerization process, cannot be used in the vapor phase because of their high boiling points. Such materials are, for example, n-propyl, isopropyl, n-butyl and isobutyl methacrylates; n-butyl, iso-butyl, hexyl, 2-ethylhexyl and octyl acrylates; diethyl and dibutyl maleates; diethyl and dibutyl fumarates; vinyl caproate; vinyl laurate; vinyl benzoate; octene and nonene.

It is, therefore, an object of my invention to develop a process by which mixtures of monomers having widely separated boiling points may be graft polymerized to fibrous cellulosic webs. Another object of my invention is to develop a process for graft polymerizing heterogeneous monomer mixtures which will incorporate many of the features of the vapor phase process and will thereby avoid the waste and the hazards of bulk liquid phase polymerization.

According to the process of my invention, a cellulosic fibrous web containing absorbed therein an aqueous solution of an initiator of the peroxygen type is first immersed in a liquid addition-polymerizable monomer of relatively high boiling point, and is then exposed to an atmosphere of easily vaporized addition-polymerizable monomer in the vapor phase. Rather unexpectedly, this procedure results in rapid graft polymerization, the reaction rate being at least equal to and in many cases exceeding the rate observed in vapor phase graft polymerization involving a single monomer. The resulting grafted cellulosic webs are uniform in appearance and give every indication that the polymer which has been applied to the web by grafting is a copolymer containing substantial proportions of the two different types of monomers. I have discovered, in addition, that I am able to obtain greatly increased reaction rates by the simple expedient of controlling or reducing the proportion of liquid monomer so that it does not exceed about 100% of the weight of the cellulosic fibrous web. This, therefore, constitutes a preferred form of my invention.

My invention will be more clearly understood by reference to the following examples, in which all parts and percentages are by weight.

Example I

A graft polymerization reactor was made by fitting a laboratory flask with a reflux condenser tube open at its upper end. A quantity of monomeric acrylonitrile containing 2% of hydroquinone to act as a polymerization inhibitor was placed in the flask and heat was applied to vaporize the acrylonitrile and drive out the air in the condenser tube. The temperature of the vapors in the tube was about 67–68° C.

Weighed samples of cotton linter paper were soaked for twenty minutes in a three percent aqueous solution of potassium persulfate, pressed between two sheets of filter paper for ten seconds, and then immersed in a bath of n-butyl acrylate for three minutes at room temperature. The paper was found to have absorbed about 300 percent of its weight of n-butyl acrylate. The samples were then immediately introduced into the acrylonitrile vapor in the condenser tube. Two samples were removed after six minutes, and two more were allowed to remain in the acrylonitrile vapor for a total of 10 minutes. The grafted samples were washed in boiling acetone and then in boiling water, were dried at 60° C. for one hour and were then reweighed.

The yields of graft copolymer expressed as percent weight increase of the samples were as follows: after six minutes, 44.5 and 42.5 percent; after 10 minutes, 68.7 and 87.6 percent.

Example II

The method of Example I was followed, except that, after having been soaked in n-butyl acrylate, the paper samples were again pressed between two sheets of filter paper for 10 seconds. The amount of n-butyl acrylate in the paper samples was thereby reduced to about 100 percent of the weight of the paper.

The yield of graft copolymer, expressed as percent weight increase of the samples, was 80.0 and 87.6 percent after six minutes of grafting; after twelve minutes it was 97.5 and 101 percent.

It is evident from a comparison of the yields of graft copolymer in Examples I and II that the rate of the grafting reaction, especially in the early or induction period of the reaction, is dependent on the ratio of n-butyl acrylate to acrylonitrile, and that the reaction is favored by a lower proportion of n-butyl acrylate in the sample.

Example III

The procedure of Example I was followed, using a mixture of nonene isomers as the liquid monomer in which the initiator-treated samples were immersed before being exposed to the acrylonitrile vapors. After a reaction time of ten minutes, the yield of graft copolymer was 55.5 percent.

*Example IV*

The procedure of Example II was followed, the initiator-treated samples being soaked in nonene and pressed between two sheets of filter paper to remove excess nonene before being exposed to acrylonitrile vapors. After a reaction time of twenty minutes, the yield of graft copolymer was 168 percent.

The acid resistance of paper which had been treated according to the process of my invention was determined by the following method.

Weighed samples of cotton linter paper which had been grafted by the process described in the above examples were soaked in 40 percent sulfuric acid at 71° C. for a period of 117 hours. After removal from the acid bath, the samples were washed thoroughly in cold demineralized water and dried at 100° C. for thirty minutes. The samples were then reweighed to determine their weight loss during the acid treatment.

Although untreated cotton linter paper disintegrates completely after a few hours in the acid bath, the grafted samples were found to retain their shape after exposure to the acid for 117 hours. In general, acid resistance was found to increase with the amount of copolymer which had been grafted on the paper. For example, samples of paper which contained about 30 percent of grafted butyl acrylate-acrylonitrile copolymer showed a weight loss of about 12 percent after exposure to the acid for 117 hours, while samples containing between 45 and 50 percent of the graft copolymer lost only about 9 percent of their weight. Samples which contained about 35 percent of grafted nonene-acrylonitrile copolymer showed a weight loss of about 11.5 percent, while samples containing about 62.5 percent of the nonene-acrylonitrile copolymer lost only 5.7 percent of their weight in the same test.

The process of my invention may be carried out with a variety of monomer combinations. Any unsaturated, addition-polymerizable monomer which is normally liquid at room temperature and which has a relatively high boiling point may be used as the liquid monomer which is absorbed in the initiator-treated substrate. For best results, the boiling point of this monomer should be at least about 120° C., in order that the grafting reaction may be carried out without substantial loss of the lower boiling monomer from the substrate during the polymerization process. The high boiling monomer may be the butyl acrylate or nonene shown in the above examples, or it may be any other acrylate or methacrylate which is normally liquid at room temperature and has a boiling point at atmospheric pressure above about 120° C., as for example isobutyl, hexyl, 2-ethylhexyl or octyl acrylate, or n-propyl, isopropyl, n-butyl or isobutyl methacrylate. Alternatively, such other relatively high boiling unsaturated addition-polymerizable monomers as diethyl maleate, dibutyl maleate, diethyl fumarate, dibutyl fumarate, vinyl caproate, vinyl laurate, octene, etc. may be used. The monomer which is used in the vapor phase to provide the atmosphere of monomer in which the grafting reaction is carried out may be any unsaturated, addition-polymerizable monomer which has a sufficient vapor pressure to permit vapor phase polymerization at temperatures below the degradation temperature of the cellulosic substrate, and preferably below the boiling point of the liquid monomer used. Of particular importance are the vinyl monomers, although conjugated diolefins may also be used. I may use, for example, as the vapor phase monomer in the process of my invention, methyl methacrylate, ethyl acrylate, chloroprene, acrylonitrile or vinyl acetate.

The rate of the graft polymerization reaction is strongly affected by the relative amounts of the high boiling liquid monomer and the vapor phase monomer, as shown by the above examples. I have found that very favorable results are obtained when the proportion of liquid monomer is kept rather low, i.e. when the amount of liquid monomer is between about 80 and about 100 percent of the weight of the substrate. The amount of liquid monomer may be controlled by limiting the time of immersion of the substrate in the monomer, or by pressing out the excess liquid monomer from the substrate as shown above.

The graft polymerization process of my invention may be carried out at temperatures ranging from 50° C. to 100° C. or even up to about 120° C. I prefer, however, for best results, to use vapor temperatures of between 55° and 90° C.

A variety of cellulosic materials may be employed as substrates in the grafting reaction, for example, paper or non-woven webs containing cotton or wood fibers or mixtures thereof or woven cotton materials. It is important to note, however, that the paper or other substrate which is to be used in the grafting reaction must not contain additives such as wet-strength resins in amounts sufficient to inhibit the polymerization reaction.

Any of the well known peroxygen-type initiators may be used in the process of my invention. These include, for example, hydrogen peroxide, the per-salts such as sodium, potassium or ammonium persulfate, sodium perborate and the like, peracetic acid or any other water-soluble peroxygen compound. The initiator is used in aqueous solution, in concentrations ranging from 0.1 percent to 5.0 percent, and preferably from 0.5 percent to 3.0 percent.

I claim:

1. A graft polymerization process in which a fibrous web of cellulose containing absorbed therein an aqueous solution of a graft polymerization peroxygen initiator is immersed in a body of liquid ethylenically, unsaturated, addition-polymerizable monomeric material having a boiling point above about 120° C. and is soon thereafter contacted with an atmosphere of the vapor of another ethylenically unsaturated, addition-polymerizable monomeric material at atmospheric pressure, the temperature of the vapor being between about 50° C. and about 100° C. for a time sufficient to produce a graft copolymer.

2. The process of claim 1 in which the amount of liquid monomeric material absorbed in the fibrous web at the time of its contact with the atmosphere of monomer vapor is between about 80 and about 100 percent of the weight of the fibrous web.

3. The process of claim 1 in which the fibrous cellulosic web is paper.

4. The process of claim 1 in which the liquid monomeric material is n-butyl acrylate.

5. The process of claim 1 in which the liquid monomeric material is nonene.

6. The process of claim 1 in which the vapor phase monomeric material is acrylonitrile.

7. The process of claim 1 in which the peroxygen initiator is potassium persulfate.

References Cited by the Examiner

FOREIGN PATENTS 818,412   8/59   Great Britain.

NORMAN G. TORCHIN, *Primary Examiner.*

LEON J. BERCOVITZ, *Examiner.*